US010922495B2

(12) United States Patent
Rosenberg et al.

(10) Patent No.: US 10,922,495 B2
(45) Date of Patent: Feb. 16, 2021

(54) COMPUTERIZED ENVIRONMENT FOR HUMAN EXPERT ANALYSTS

(71) Applicant: Epistema Ltd., Tel Aviv (IL)

(72) Inventors: Joab Rosenberg, Tel Aviv (IL); Dror Ben Eliezer, Pardes Hana-Karkur (IL); Yair Rauscher, Tel Aviv (IL); Zohar Guy, Herzliya (IL); Zvika Shlomo Katzenelson, Holon (IL); Shlomo Kraus, Tel Aviv (IL)

(73) Assignee: MENT SOFTWARE LTD., Tel Aviv (IL)

( * ) Notice: Subject to any disclaimer, the term of this patent is extended or adjusted under 35 U.S.C. 154(b) by 162 days.

(21) Appl. No.: 16/257,413

(22) Filed: Jan. 25, 2019

(65) Prior Publication Data

US 2019/0163744 A1 May 30, 2019

Related U.S. Application Data

(63) Continuation of application No. PCT/IL2017/050827, filed on Jul. 23, 2017.
(Continued)

(51) Int. Cl.
*G06F 40/30* (2020.01)
*G06F 40/211* (2020.01)
(Continued)

(52) U.S. Cl.
CPC ............ *G06F 40/30* (2020.01); *G06F 16/367* (2019.01); *G06F 16/972* (2019.01); *G06F 17/18* (2013.01);
(Continued)

(58) Field of Classification Search
CPC .... G06F 40/211; G06F 40/253; G06F 40/268; G06F 40/284; G06F 40/30; G06F 40/295; G06F 16/3344; G06F 3/0482
See application file for complete search history.

(56) References Cited

U.S. PATENT DOCUMENTS 5,778,157 A * 7/1998 Oatman ................ G06N 5/04
706/46
6,853,975 B1 2/2005 Dirksen et al.
(Continued)

OTHER PUBLICATIONS

The International Search Report and The Written Opinion for PCT/IL2017/050827 dated Nov. 5, 2017, ISA, Israel Patent Office, Jerusalem.

*Primary Examiner* — Lamont M Spooner
(74) *Attorney, Agent, or Firm* — M&B IP Analysts, LLC

(57) ABSTRACT

A method providing a computerized environment for human expert analyst community/ies including human expert analyst end users, including for at least one human expert analyst community: defining a prediction ontology stored in computer memory, including predetermined grammatical structure/s for predictions generated by human expert analysts in the community, the structure for conditional predictions including antecedent and consequence clauses; providing digitally represented analyst predictions, including individual analyst prediction/s expressed in the prediction ontology, being conditional, and associated with individual known network location/s from a universe thereof within the organization's computerized data network at which location, resource/s pertaining to the individual analyst prediction is stored; and generating and storing a uniform resource identifier-embedded prediction graph comprising: nodes which represent the analyst prediction's clauses, and at least one directional edge extending between the nodes, a uniform resource identifier identifying the individual known location being embedded in the nodes/edges.

26 Claims, 5 Drawing Sheets

Related U.S. Application Data

(60) Provisional application No. 62/367,146, filed on Jul. 27, 2016.

(51) Int. Cl.
  *G06Q 10/04*    (2012.01)
  *G06F 16/36*    (2019.01)
  *G06F 16/958*   (2019.01)
  *G06F 17/18*    (2006.01)
  *G06N 5/04*     (2006.01)
  *G06Q 40/06*    (2012.01)

(52) U.S. Cl.
  CPC ............ *G06F 40/211* (2020.01); *G06N 5/04* (2013.01); *G06Q 10/04* (2013.01); *G06Q 40/06* (2013.01)

(56) References Cited

U.S. PATENT DOCUMENTS

| | | | |
|---|---|---|---|
| 8,185,469 B2 | 5/2012 | Tanner | |
| 8,185,558 B1* | 5/2012 | Narayanan | G06F 16/24 |
| | | | 707/798 |
| 9,176,966 B2* | 11/2015 | Silverstein | G06F 16/116 |
| 9,299,042 B2 | 3/2016 | Eck | |
| 9,626,385 B2* | 4/2017 | Runchey | G06F 16/20 |
| 10,740,678 B2* | 8/2020 | Ho | G06F 16/367 |
| 2002/0052820 A1 | 5/2002 | Gatto | |
| 2003/0065601 A1 | 4/2003 | Gatto | |
| 2004/0133497 A1 | 7/2004 | Spear | |
| 2004/0243531 A1* | 12/2004 | Dean | G06F 40/30 |
| | | | 706/55 |
| 2005/0154535 A1* | 7/2005 | Sun | G16B 5/00 |
| | | | 702/19 |
| 2005/0165594 A1* | 7/2005 | Chandra | G16B 5/00 |
| | | | 703/11 |
| 2006/0217994 A1 | 9/2006 | Gardner et al. | |
| 2008/0222064 A1* | 9/2008 | Larimer | G06Q 30/02 |
| | | | 706/16 |
| 2010/0114879 A1* | 5/2010 | Zhong | G06F 40/295 |
| | | | 707/723 |
| 2011/0131244 A1* | 6/2011 | Padovitz | G06F 16/355 |
| | | | 707/776 |
| 2012/0005224 A1* | 1/2012 | Ahrens | G06F 16/285 |
| | | | 707/769 |
| 2012/0036092 A1 | 2/2012 | Kayser | |
| 2012/0173541 A1* | 7/2012 | Venkataramani | G06F 16/248 |
| | | | 707/747 |
| 2012/0323558 A1 | 12/2012 | Nolan et al. | |
| 2013/0018954 A1* | 1/2013 | Cheng | G06F 16/436 |
| | | | 709/204 |
| 2013/0066823 A1* | 3/2013 | Sweeney | G06N 5/02 |
| | | | 706/50 |
| 2013/0187926 A1* | 7/2013 | Silverstein | G06F 16/972 |
| | | | 345/440 |
| 2013/0191372 A1* | 7/2013 | Lee | G06F 16/9535 |
| | | | 707/722 |
| 2014/0095419 A1* | 4/2014 | Gandhi | H04L 67/10 |
| | | | 706/46 |
| 2014/0143252 A1* | 5/2014 | Silverstein | G06F 16/80 |
| | | | 707/737 |
| 2014/0317038 A1* | 10/2014 | Mojsilovic | G06N 5/02 |
| | | | 706/46 |
| 2014/0337306 A1* | 11/2014 | Gramatica | G06F 16/2471 |
| | | | 707/706 |
| 2015/0026260 A1* | 1/2015 | Worthley | G06F 16/958 |
| | | | 709/204 |
| 2016/0012044 A1* | 1/2016 | Franceschini | G06F 16/951 |
| | | | 707/722 |
| 2016/0188682 A1* | 6/2016 | Silverstein | G06F 16/248 |
| | | | 707/803 |
| 2017/0168751 A1* | 6/2017 | Stevens | G06F 16/24568 |
| 2017/0286835 A1* | 10/2017 | Ho | G06F 16/367 |
| 2017/0316315 A1* | 11/2017 | Park | G06F 16/90335 |
| 2018/0046928 A1* | 2/2018 | Jang | H04L 63/1416 |

* cited by examiner

A1. Provide computer memory repository storing data e.g. natural language documents each pertaining to prediction/s generated by human expert analyst/s

↓

A2. define electronic data/prediction associations where each record includes:
Analyst prediction, in natural language or pre-defined ontology
Hyperlink to network location, within organization's natural language document repository, at which a natural language document, pertaining to e.g. supporting and/or explaining prediction, is stored.
Id of analyst who generated prediction

↓

B. Define prediction ontology where at least some predictions (conditional predictions) have a predetermined grammatical structure

↓

C. If analyst predictions are in natural language, translate analyst predictions in natural language to prediction ontology defined in operation (B)

↓

D. Generate and store in computer memory nodes and edges defining a prediction graph. Nodes are typically hyperlinked and edges are typically directional and are typically hyperlinked. In graph, each node represents a clause (antecedent or consequence or sole clause constituting a declarative prediction) ; directional edges extend from each conditional prediction's antecedent clause node to the same conditional prediction's consequence clause node.

↓

E. Use the prediction graph to support analyst work sessions. For example, at least one screen display, for analysts, of at least a portion of the prediction graph, may be generated. Using hyperlinking functionality, define for at least one node/edge in the display a direct or indirect (e.g. via a page in memory) hyperlink to data in the organization's computerized system pertaining to that node/edge e.g. prediction metadata such as but not limited to:
* natural language document/s and/or
* numerical table/s
* voting input functionality allowing an analyst to vote for/against a declarative/conditional prediction associated with the node/edge;
* voting results to date, by other analysts, regarding a declarative/conditional prediction associated with the node/edge respectively

Fig. 1

| prediction id | prediction class | user id | user rating | level of confidence | vote type | score contribution |
|---|---|---|---|---|---|---|
| 1 | Equivalence | 10 | 1.1 | 0.9 | upvote | 1.1 * 0.9 = 0.99 |
| 1 | Equivalence | 11 | 2.3 | 0.7 | upvote | 2.3 * 0.7 = 1.61 |
| 2 | Equivalence | 12 | 1.7 | 0.6 | upvote | 1.7 * 0.6 = 1.02 |
| 3 | Contradicting | 11 | 2.3 | 0.9 | downvote | 2.3 * 0.9 = 2.07 |

Fig. 3a

| prediction id | prediction class | user id | user rating | level of confidence | vote type | score contribution |
|---|---|---|---|---|---|---|
| 1 | equivalence | 10 | 1 | 0.9 | upvote | 1 * 0.9 = 0.9 |
| 1 | equivalence | 11 | 1 | 0.7 | upvote | 1 * 0.7 = 0.7 |
| 2 | equivalence | 12 | 1 | 0.6 | upvote | 1 * 0.6 = 0.6 |
| 3 | contradicting | 11 | 1 | 0.9 | downvote | 1 * 0.9 = 0.9 |

Fig. 3b

| prediction id | prediction class | user id | user rating | level of confidence | vote type | score contribution |
|---|---|---|---|---|---|---|
| 2 | equivalence | 11 | 2.3 | 0.3 | downvote | 2.3 * 0.3 = 0.69 |
| 3 | contradicting | 12 | 1.7 | 0.5 | upvote | 1.7 * 0.5 = 0.85 |

Fig. 3c

| | the conditions | | the conclusion |
|---|---|---|---|
| row | interest rate (%) | oil index | apple share worth ($) |
| 1 | 1.5 | 3.4 | 9.7 |
| 2 | 2.5 | 3.5 | 11.2 |
| 3 | 3.0 | 3.4 | 8.5 |
| 4 | 2.2 | 3.4 | 11.8 |
| 5 | 2.8 | 3.4 | 9.3 |

Fig. 4

COMPUTERIZED ENVIRONMENT FOR HUMAN EXPERT ANALYSTS

CROSS REFERENCE TO RELATED APPLICATIONS

This application is a continuation of an International Application No. PCT/IL2017/050827 filed Jul. 23, 2017, which claims the benefit of U.S. Provisional Patent Application No. 62/367,146 filed Jul. 27, 2016. The contents of the above mentioned applications are incorporated herein by reference for all that they contain.

FIELD OF THIS DISCLOSURE

The present invention relates generally to enterprise support systems and more particularly to platforms for human experts.

BACKGROUND FOR THIS DISCLOSURE

In large organizations, hundreds or more analysts may be employed, often in multiple facilities, in various geographical locations, and even plural continents. These analysts generate a plethora of data resources as well as attempting to develop predictions associated therewith.

Technologies which may be useful for the above use cases include those described in the following patent documents:
US2006217994(A1)—Method and system for harnessing collective knowledge
US2004133497(A1)—System and methods for determining performance-weighted consensus
U.S. Pat. No. 8,185,469(B2)—Computer-Based Method For Teaming Research Analysts To Generate Improved Securities Investment Recommendations
US2003065601(A1)—Security analyst performance tracking and analysis system and method
US2002052820(A1)—Security analyst estimates performance viewing system and method
U.S. Pat. No. 6,853,975(B1)—Method of rating employee performance
IBM Watson is operative for text mining and complex analytics on unstructured data, e.g. to support an expert system including natural language processing.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

The following terms may be construed either in accordance with any definition thereof appearing in the prior art literature or in accordance with the specification, or as follows:
prediction: aka claim/textual statement e.g. if-then statement/premise/forecast/conjecture/hypothesis/premise.
It is appreciated that "predictions" need not relate to future events and may include any statement, even regarding an event that is believed to have occurred in the past. A prediction may also include an if-then statement that is believed to already have come true, e.g. "Company x has been trying to develop technology y since 2003" or "if company x's shares fall in 2010, then company x will receive negative press in 2011".

An ontology may include plural equivalent terms e.g. may use different terms for a statement regarding an event that is believed to have occurred in the past vs. an event predicted to occur in future. For example: "since company x's shares fell in 2010, therefore company x received negative press in 2011" may appear as a prediction, and "since-therefore" may be deemed equivalent, in the ontology, to "if-then".

Typically, predictions are not in natural language, but rather use only entities/terms/words taken from a predefined ontology. Typically, if an end user generates a prediction which deviates from the ontology, an "ontology-spellcheck" functionality alerts the user to use of words which are not within the ontology, typically using the same technology as a conventional spellcheck functionality which alerts a user to use of words which are not within the "ontology" of correctly spelled words in the English (say) language.

Data: may be structured or unstructured and may comprise, inter alia:
I. natural language document data e.g. stored in an editable or non-editable document such as pdf-format
II. data tables e.g. of alphanumeric data and hierarchical data e.g. in XML or JSON format
III. multimedia
IV. prediction meta-data: alphanumeric data, including a prediction identifier and/or title, characterizing an individual prediction and formatted in an agreed upon format for representing prediction characteristics
V. URIs representing associations between data e.g. between a prediction's identifier and/or title on the one hand, and natural language documents and/or tables and/or multimedia relevant to that prediction, on the other hand hyperlink: intended to include any portion of a display presented to a user of a computerized network on her or his workstation, which, if interacted with by the user, e.g. clicked upon, facilitates user access to a resource, e.g. clickable text or graphic button that typically includes a locator e.g. URL, and takes the user to a resource at a particular location on a network e.g. web site. Users' interactions with representations of resources over the network may be governed by any suitable conventional communications protocol/syntax and may include any component of a computerized display that links to a resource. Typically, a user activates the hyperlink by clicking on it. Typically, this facilitates use of hypertext or hypermedia systems, including but not limited to the World Wide Web and private networks.

link: intended to include software functionality which allows a user to reach a resource and typically includes information identifying the resource such as a uniform (e.g. having a uniform syntax defined by a uniform protocol) locator or name for the resource.

uniform resource identifier: intended to include any navigation information embedded in a display for presentation to a user of a computer network (not necessarily Internet) using any suitable technology such as but not limited to a button, menu option, hyperlink, hot link or other link to allow the user to navigate the network, such as but not limited to a locator e.g. URL or name e.g. URN (uniform resource name), expressed using a suitable predefined syntax and typically although not necessarily embedded in a link. URI is an example of a ubiquitous uniform resource identifier.

Uniform Resource Locator (URL): intended to include any reference to a resource stored on a computer network (not necessarily Internet), specifying the resource's location on the computer network, e.g. network address, and including a mechanism for retrieving the resource to provide access of a network user thereto. Any suitable protocol may underlie the uniform resource identifier such as but not limited to HTTP—Hyper Text Transfer Protocol—or any other suitable request-response protocol, such as but not limited to a web address.

Clause: in a declarative prediction A, A is the clause. In a conditional prediction "if A then B"—A and B are both clauses (whether simple or complex); A being an antecedent clause and B being a consequence clause. Typically, the prediction ontology defines grammar for each clause in terms of, say, subject, object and predicate (for example: the ontology may stipulate that each clause must include a subject and a predicate as well as, optionally, other parts of speech) and the ontology includes a "permissible" vocabulary for each of these i.e. for the subject, for the object and for the predicate.

complex clause: logical combination (typically via logical operators such as if, and) of (ultimately) simple clauses such as "rates will increase". Example: "rates will increase AND Russia will attack OR rain will fall"

declarative prediction: includes a single clause e.g. a simple or complex clause.

conditional prediction: such as "if clause A then clause B" where clauses A and B can be either simple or complex Certain embodiments seek to provide an architecture for software systems serving analysts which vastly enhances each analyst end user's ability to navigate usefully within the system serving her or him.

Certain embodiments seek to provide an architecture for software systems serving analysts where predictions are represented in memory topologically as a graph database such that in the graph database and/or in a visual representation generated therefrom, each clause in each prediction is represented in computer memory as a node, directional edges extend from cause (antecedent) clause to effect (consequence) clause and at least one edge and/or node have URIs to network resources e.g. natural language documents and formalized e.g. tabulated alphanumerical data resources, associated to that edge or node.

Certain embodiments seek to provide a computerized system including a processor and are operative to enable analyst end users to manipulate data resources stored in a computer network, as a function of the data resources' links to analyst work products, e.g. predictions, having at least some known logical relationships defined therebetween.

Certain embodiments of the present invention seek to provide at least one processor in communication with at least one memory, with instructions stored in such memory executed by the processor to provide functionalities which are described herein in detail.

The present invention typically includes at least the following embodiments:

Embodiment 1. A method providing a computerized environment for at least one human expert analyst community including a multiplicity of human expert analyst end users, the method including:

for at least one organization including a human expert analyst community:

defining a prediction ontology stored in computer memory, including at least one predetermined grammatical structure for predictions generated by human expert analysts in the community, and wherein the grammatical structure for conditional predictions includes an antecedent clause and a consequence clause;

providing digitally represented analyst predictions, including at least one individual analyst prediction which is expressed in the prediction ontology, is conditional, and is associated with at least one individual known network location from among a universe of network locations within the organization's computerized data network at which individual known network location, at least one resource pertaining to the individual analyst prediction is stored; and using a processor for generating and storing in computer memory a uniform resource identifier-embedded prediction graph comprising:

nodes, including at least first and second nodes which represent the individual analyst prediction's antecedent and consequence clauses respectively, and edges, including at least one directional edge extending between the first and second nodes, and wherein a uniform resource identifier identifying the individual known location is embedded in at least one of the nodes and edges.

Embodiment 2. A method according to any of the preceding embodiments wherein the uniform resource identifier comprises a locator specifying the resource's location on the network and including functionality for retrieving the resource to provide access of a network user thereto.

Embodiment 3. A method according to any of the preceding embodiments wherein the uniform resource identifier-embedded prediction graph comprises a hyperlinked graph in which at least one of the nodes and edges is hyperlinked to the individual known location.

Embodiment 4. A method according to any of the preceding embodiments wherein the resource comprises at least one natural language document.

Embodiment 5. A method according to any of the preceding embodiments wherein the resource comprises at least one alphanumerical data resource.

The alphanumerical data resource may for example include a data tables or a hierarchical data resource e.g. in XML or JSON format.

Embodiment 6. A method according to any of the preceding embodiments wherein the uniform resource identifier is embedded in at least one of the nodes.

Embodiment 7. A method according to any of the preceding embodiments wherein the uniform resource identifier is embedded in at least one of the edges.

Embodiment 8. A method according to any of the preceding embodiments wherein the locator comprises a URL.

Embodiment 9. A method according to any of the preceding embodiments wherein at least one of the nodes and edges is hyperlinked directly to the individual known location.

Embodiment 10. A method according to any of the preceding embodiments wherein at least one of the nodes and edges is hyperlinked indirectly to the individual known location.

Embodiment 11. A method according to any of the preceding embodiments wherein at least one of the nodes and edges is hyperlinked to a page which stores data regarding the at least one of the nodes and edges, including the individual known location, thereby to indirectly link the at least one of the nodes and edges to the individual known location.

Embodiment 12. A method according to any of the preceding embodiments including identifying at least first and second clauses as equivalent/identical within the ontology and representing at least the first and second clauses by a single node in the graph.

Embodiment 13. A method according to any of the preceding embodiments wherein all clauses which are identical within the ontology are represented by a single node in the graph.

Embodiment 14. A method according to any of the preceding embodiments and also comprising voting functionality enabling analysts to vote for/against predictions.

Embodiment 15. A method according to any of the preceding embodiments and wherein an analyst can access the voting functionality and vote for/against an individual node from among the nodes, via at least one uniform resource identifier embedded at the individual node, and wherein analyst votes for each individual node are combined over analysts to yield a crowd score for the individual node.

Embodiment 16. A method according to any of the preceding embodiments and wherein an analyst can view voting results generated by the voting functionality for an individual node from among the nodes, via at least one uniform resource identifier embedded at the individual node.

Embodiment 17. A method according to any of the preceding embodiments and wherein a data score is also generated for the individual node and is combined with the crowd score.

Embodiment 18. A method according to any of the preceding embodiments and wherein a data score is generated for an individual node from among the nodes, including accessing and parsing at least one alphanumeric data table linked to the individual node via at least one uniform resource identifier embedded at the individual node.

Embodiment 19. A method according to any of the preceding embodiments and wherein updating the alphanumeric data table triggers at least one update of data scores of all nodes associated with the alphanumeric data table and not of nodes not associated with the alphanumeric data table.

Embodiment 20. A method according to any of the preceding embodiments and wherein an analyst can view data scores generated for an individual node from among the nodes, via at least one uniform resource identifier embedded at the individual node.

Embodiment 21. A method according to any of the preceding embodiments and also comprising presenting a representation of at least a portion of the uniform resource locator-embedded hyperlinked prediction graph to at least one analyst end user from among the multiplicity of analyst end users, thereby allowing the multiplicity of analyst end users to interact effectively with the predictions including effectively accessing resources within the computerized data network which pertains to the predictions.

Embodiment 22. A method according to any of the preceding embodiments wherein the resource comprises an audio-visual resource.

It is appreciated that audio-visual resources may for example include video, "still" pictorial representations of diagrams such as histograms, scatter diagrams or pie charts, audio recordings.

Embodiment 23. A method according to any of the preceding embodiments wherein the voting functionality is characterized in that for at least one prediction attracting more than N upvotes, including an Nth upvote and an (N+1)th upvote, the Nth upvote increases the at least one prediction's crowd score prediction more than the (N+1)th upvote does.

Embodiment 24. A method according to any of the preceding embodiments wherein the voting functionality is characterized in that for at least one prediction having a contradicting prediction attracting more than N downvotes, including an Nth downvote and an (N+1)th downvote, the Nth downvote increases the at least one prediction's crowd score prediction more than the (N+1)th downvote does.

Embodiment 25. A method according to any of the preceding embodiments wherein a legacy graph database software tool, which supports storage of node properties, is used to generate the graph and wherein a text string representing at least one URI identifying a network location storing a resource pertaining to a particular node is stored as a property of the particular node.

Embodiment 26. A method according to any of the preceding embodiments wherein the digitally represented analyst predictions also include at least one declarative analyst prediction.

Embodiment 27. A computer program product, comprising a non-transitory tangible computer readable medium having computer readable program code embodied therein, the computer readable program code adapted to be executed to implement a method providing a computerized environment for at least one human expert analyst community including a multiplicity of human expert analyst end users, the method including:

for at least one organization including a human expert analyst community:
defining a prediction ontology stored in computer memory, including at least one predetermined grammatical structure for predictions generated by human expert analysts in the community, and wherein the grammatical structure for conditional predictions includes an antecedent clause and a consequence clause;
providing digitally represented analyst predictions, including at least one individual analyst prediction which is expressed in the prediction ontology, is conditional, and is associated with at least one individual known network location from among a universe of network locations within the organization's computerized data network at which individual known network location, at least one resource pertaining to the individual analyst prediction is stored; and
using a processor for generating and storing in computer memory a uniform resource identifier-embedded prediction graph comprising:
nodes, including at least first and second nodes which represent the individual analyst prediction's antecedent and consequence clauses respectively, and
edges, including at least one directional edge extending between the first and second nodes,
and wherein a uniform resource identifier identifying the individual known location is embedded in at least one of the nodes and edges.

Embodiment 28. A system providing a computerized environment for at least one human expert analyst community including a multiplicity of human expert analyst end users, the system including, for at least one organization including a human expert analyst community: computer memory storing a prediction ontology, including at least one predetermined grammatical structure for predictions generated by human expert analysts in the community, and wherein the grammatical structure for conditional predictions includes an antecedent clause and a consequence clause; and digitally represented analyst predictions, including at least one individual analyst prediction which is expressed in the prediction ontology, is conditional, and is associated with at least one individual known network location from among a universe of network locations within the organization's computerized data network at which individual known network location, at least one resource pertaining to the individual analyst prediction is stored; and a processor operative for generating and storing in computer memory a uniform resource identifier-embedded prediction graph comprising: nodes, including at least first and second nodes which represent the individual analyst prediction's antecedent and consequence clauses respectively, and edges, including at least one directional edge extending between the first and second nodes, and wherein a uniform resource identifier identifying the individual known location is embedded in at least one of the nodes and edges.

Also provided, excluding signals, is a computer program comprising computer program code for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIGS. 1, 5 are simplified flowchart illustrations of methods which may be performed by the system shown and described herein and/or by any suitably programmed processor/s and may include some or all of the illustrated operations, suitably ordered e.g. as shown.

FIGS. 3a, 3b, 3c, 4 are tables, which may include some or all of the fields and/or records shown and which are useful in understanding certain embodiments of the present invention.

Figure 2:
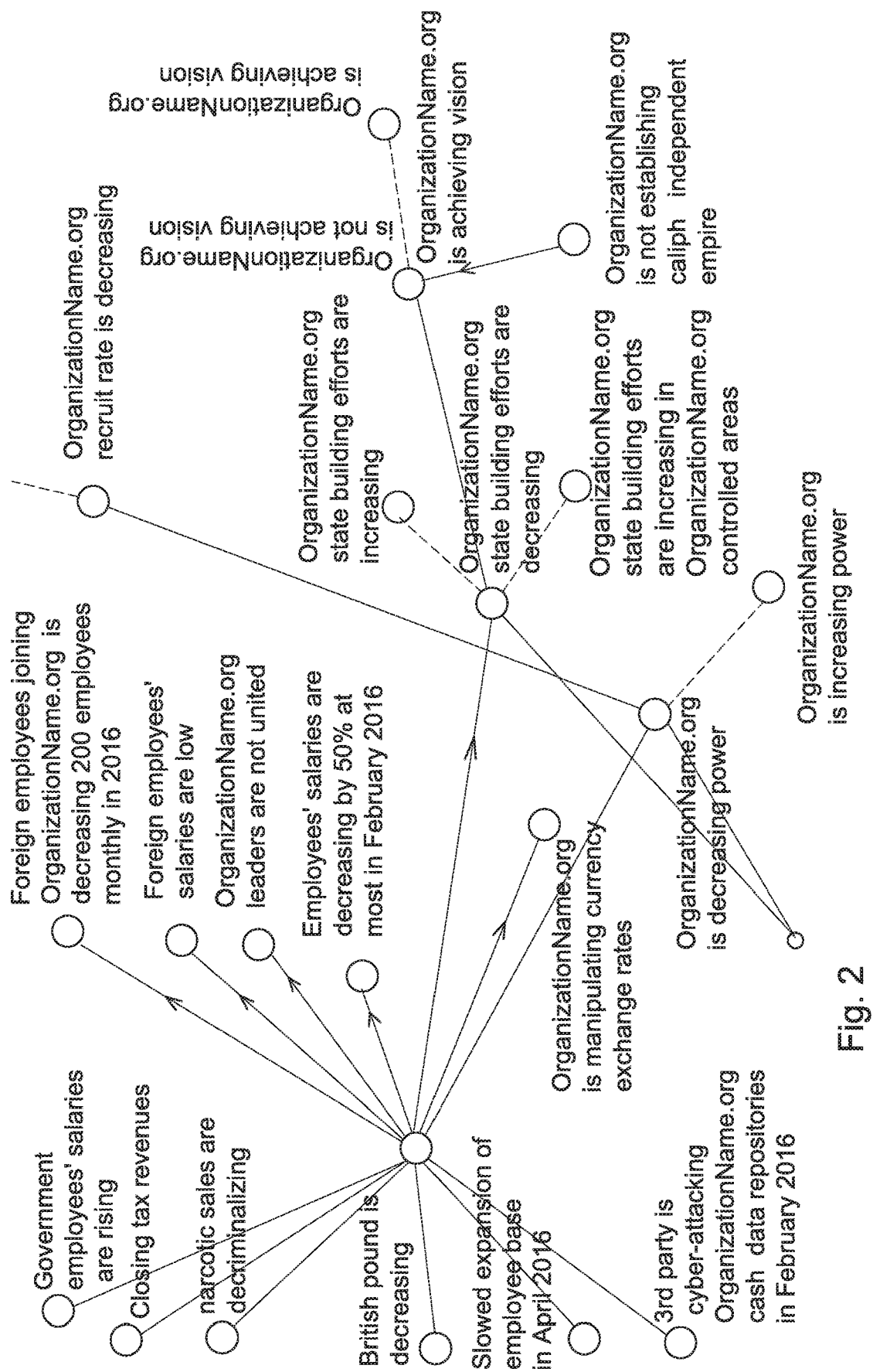
FIG. 2 is a simplified pictorial illustration of a hyperlinked, visual representation of predictions in a prediction database.

Methods and systems included in the scope of the present invention may include some (e.g. any suitable subset) or all of the functional blocks shown in the specifically illustrated implementations by way of example, in any suitable order e.g. as shown. Each functional block may for example be implemented as a suitably programmed processor, one or more, or module within a processor.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Reference is now made to FIG. 1 which illustrates a simplified method for providing a computerized environment for at least one human expert analyst community including a multiplicity of human expert analyst end users. For at least one organization including a human expert analyst community, the method may be operative for at least one of: defining a prediction ontology including at least one predetermined grammatical structure for predictions generated by human expert analysts in the community, and wherein the grammatical structure for conditional predictions includes an antecedent clause and a consequence clause; providing digitally represented analyst predictions, including at least one individual analyst prediction which is expressed in the prediction ontology, is conditional, and is associated with at least one individual known network location from among a universe of network locations within the organization's computerized data network at which individual known network location, at least one resource pertaining to the individual analyst prediction is stored; and generating and storing in computer memory a uniform resource identifier-embedded prediction graph comprising: nodes, including at least first and second nodes which represent the individual analyst prediction's antecedent and consequence clauses respectively, and edges, including at least one directional edge extending between the first and second nodes, and wherein a uniform resource identifier identifying the individual known network location is embedded in at least one of the nodes and edges.

According to certain embodiments, any suitable technology may be employed to link a prediction fed into a computerized system including a processor and serving an analyst population.

A prediction may be generated by an analyst using the system, and a data resource in the network. For example, an analyst may import such a resource into a system including a server/processor and may name (generate an identifier to serve in the system as a key or index for) the resource. When the analyst later generates a prediction, s/he may associate that prediction with the resource, identified by its name.

Alternatively or in addition, if text windows are defined, an analyst may enter a prediction into one such window and a URI link (to a data resource he/she deems pertinent to that prediction) into a second window, and the system may interpret this sequence of events as a command to associate the data resource at that URI link, with that prediction, including retrieving the URI from the second window and embedding the URI in the node or edge representing the prediction in computer memory.

Alternatively or in addition, an entire population of predictions and associated URIs may be imported in a computer file having a predetermined format clarifying the associations therebetween (e.g. a table in which each row includes a prediction in natural language in a first column and a URI associated therewith in a second column). The system then retrieves the link from the second column.

A retrieved link may for example be stored as a property in a record in computer memory representing a particular node or edge.

The method of FIG. 1 may include some or all of the following operations, suitably ordered e.g. as shown:

A1. Provide electronic data repository storing
  (a) natural language documents each pertaining to e.g. Supporting and/or explaining a prediction generated by a human expert analyst and/or
  (b) numerical or alphanumeric data typically structured e.g. in table form, where each column typically has a unique name, and numerical values within the tables each have designated units (e.g. kilogram, centimeter, %) or are unit-less. Typically, when uploading tabular data containing numerical or categorical values, every column of the tabular data should have a unique name.

A2. define electronic data/prediction associations e.g. Table (such as an excel file) where each record/table-row includes at least the following fields:
  Analyst prediction, in natural language or pre-defined ontology
  Hyperlink to network location, within organization's natural language document repository, at which a natural language document, pertaining to e.g. Supporting and/or explaining prediction, is stored.
  Id of analyst who generated prediction Each Prediction typically comprises a textual or logical statement such as "the interest rate in Japan will increase in April 2017". Prediction properties may include some or all of: prediction id, user id (of the analyst who generated the prediction), level of confidence.

The system allows users to add predictions (textual statements), Once a user adds a prediction to the system, he may also assign his level of confidence as an element of metadata for the prediction e.g. as described herein. The system stores the prediction, the user name and his confidence level in the database.

It is appreciated that according to certain embodiments, data may be uploaded e.g. as a file, following which a network location is assigned thereto by the server.

It is appreciated that according to certain embodiments, the server provides a user interface with a text-box for uploading data and the end user can then copy-paste data that he has generated or found in an external source, into the text-box, following which a network location is assigned to this data by the server.

B. Provide prediction ontology where at least some predictions (conditional predictions) have a predetermined grammatical structure e.g.:
  If antecedent clause then consequence clause
and at least some remaining predictions, if any, may (be declarative predictions which) have the following structure:
  declarative clause
indicating that the clause will occur, will be true, etc.

Consequence clause is also termed herein "consequent clause".

The ontology may include sets of strings (words) which can serve as subjects, predicates and objects in a given content domain. For example, if the content domain is the stock exchange, "stock" may be one possible subject and predicates may include rise, fall, increase and decrease. "rise" and "increase" may be defined as equivalent, within the ontology.

Typically, the ontology may be used to express both simple antecedent clauses and complex antecedent clauses each of which comprise a logical combination (e.g. via AND, OR) of simple antecedent clauses. Similarly, the ontology typically may be used to express both simple declarative clauses and complex declarative clauses each of which comprise a logical combination (e.g. via AND, OR) of simple consequence clauses.

Typically, the ontology includes definitions of disjoint and synonym relations between "words" in the ontology.

Typically, the ontology comprises a file that stores relations of entities and/or defines a hierarchical logic structure for predictions. For example, each prediction may be composed from clauses connected by logical connectors e.g.: IF . . . THEN . . . (aka IMPLICATION), AND and OR. For example:
IF food price will rise AND oil price will increase OR apple share will climb up AND real-estate will heighten THEN housing index will increase The most general structure of a prediction may be either
  Conditional prediction: IF (DNF) THEN (DNF)
  Declarative prediction: DNF,
where DNF is short for disjunctive normal form, which may be used to express a complex clause, e.g. an expression like:
  (A or B and C) or (A and D and E).
where A, B, C, D, E are simple clauses. Typically, a clause is defined to include at least a Subject and Predicate, and may also have Objects and prepositions. The words of a clause may be restricted only to those which are included in an ontology vocabulary. The ontology may not be constrained to any domain, in which case clauses are domain free hence predictions are also domain free.

Precedence may be defined e.g. the OR connector may take precedence over the AND connector. The following examples are also valid DNF expressions:

The ontology typically contains the synonyms relations among its terms/entities. For example "is increasing" is a synonym to "is rising". According to certain embodiments, some or all sets of predictions which are equivalent because they are either identical or are identical other than the use of synonyms (e.g.: prices are increasing" vs. "prices are rising" are represented in a graph, as described herein, by a single node. For example, "prices are increasing" and "prices are rising" may be represented as one node rather than 2 separate nodes.

The ontology may also define disjoint relations among its terms/entities. For example,
  "increase by", "decrease by" and "remains" are all mutually disjoint.

Example Ontology:
Entities
    Interest Rate
    Housing Index
Predicates:
    Increase (disjoint with Decrease, synonyms of Rise)
    Rise (disjoint with Decrease, synonyms of Increase)
    Decrease (disjoint with Increase, disjoint with Rise)
Places:
    Israel, -China, -Russia, -Belgium
Times:
    e.g. Sunday, 2017, 1730 oclock, or any combination thereof.

Given predictions with a predetermined logical structure whose terms are part of an ontology which defines synonyms and disjoint relations, this yields a well-defined semantic and logic relationship for every pair of predictions, e.g.:
    The predictions are equivalent
    The predictions are contradicting
    The predictions are neither
    Referring again to FIG. 1, C. If analyst predictions are in natural language, use human experts to translate analyst predictions in natural language to prediction ontology defined in operation B. Alternatively, the analyst predictions' a vocabulary is restricted to the prediction ontology.

D. Generate and store in computer memory nodes and edges defining a prediction graph aka "graph database". Typically, each prediction is associated with a root node in the graph database e.g. as described further herein, and if resources pertaining to that prediction are stored in computer memory, the root node is associated with a URL linking directly or indirectly to each such resource. The root node may itself contain the URL or, for example, a separate database may store unique IDs of each root node and for each, URLs linking directly or indirectly to each resource pertaining to the prediction associated with that root node.

E. Use the prediction graph to support analyst work sessions. For example, at least one screen display, for analysts, representing at least a portion of the prediction graph, may be generated.

Nodes in the screen display of the prediction graph are typically hyperlinked and edges are typically directional and are typically hyperlinked. In the screen display of the prediction graph, each node represents a clause (antecedent or consequence or sole clause constituting a declarative prediction) and directional edges are defined to extend from each conditional prediction's antecedent clause node to the same conditional prediction's consequence clause node.

Example: given a first prediction (if s1 then o1) and a second prediction (if s2 then o2) where o1, s2 are equivalent in the ontology—a directional edge may extend from a first node corresponding to the first prediction to a second node corresponding to the second prediction.

According to certain embodiments, a processor is used for identifying at least first and second clauses as equivalent/identical within the ontology and these clauses are then represented by a single node in the screen display of the prediction graph rather than by 2 separate nodes.

Any suitable technology may be employed to convert the graph database to a visual display. For example, a conditional prediction "if clause a then clause b" may be represented in the graph database as follows: a root "conditional prediction" node, plus 2 more nodes for clauses a, b respectively plus an edge marked "antecedent" from the root node to node a plus an edge marked "consequent" from the root node to node b. To generate the visual display, two visually represented nodes e.g. circles may be generated on the screen and may be labeled with captions representing clauses a, b respectively, and may be interconnected by an arrow pointing from the visually represented node representing clause a to the visually represented node representing clause b.

If clause a is the following complex clause (DNF): (a1 and a2 or a3 and a4, then the root points to a logical operator "or" node which points to 2 logical operator "and" nodes, the first of which points to a "simple clause a1" node and to a "simple clause a2" node. The second logical operator "and" node also points to 2 nodes each representing a simple clause namely to a simple clause a3" node and to a "simple clause a4" node.

Optionally, each analyst sees only a portion, selected to include "his" nodes, of the total prediction graph and to exclude at least some nodes which are not his. Using hyperlinking functionality, define for each node in the display a direct or indirect hyperlink to a natural language document associated with that node.

An "indirect" link is intended to include a link to a resource in computer memory, e.g. page in memory which itself includes one or more links to other resources.

Upon activation of a given node, the natural language document associated with that node may be presented to the analyst. Indirect hyperlinking may for example refer to a node/edge hyperlinked to a page within the organization's network devoted to that node/edge and that page may include at least one hyperlink to at least one natural language document associated with that node. More generally, using hyperlinking functionality may define for at least one node/edge in the display a direct or indirect hyperlink to data in the organization's computerized system pertaining to that node/edge. For example, each node/edge may be hyperlinked to a page within the organization's network pertaining to the clause/conditional prediction corresponding to the node/edge respectively, and the page may in turn include id/s of the analyst/s associated with that node/edge; at least one hyperlink to at least one natural language document and/or alpha numerical data tables associated with that node/edge; voting input functionality e.g. A first (typically virtual) upvoting button and a second downvoting button (or hyperlink thereto) allowing an analyst to vote for/against a declarative/conditional prediction associated with the node/edge respectively; voting results (or hyperlink thereto) to date, by other analysts, regarding a declarative/conditional prediction associated with the node/edge respectively, a score (or hyperlink thereto) regarding a declarative/conditional prediction associated with the node/edge respectively, which score may be computed by combining voting results with data supporting or negating individual predictions.

Alternatively or in addition, any or all of the above data (hyperlinks, natural language, numerical, votes, etc.) may be displayed to the analyst when he/she hovers over an individual node/edge. For example, highlights (brief excerpts) of the total available data regarding a particular node/edge may be displayed responsive to hovering over the node/edge whereas full data regarding a particular node/edge may be displayed responsive to double-clicking the node/edge.

Typically, a Predictions comparison engine, typically implemented in software on a suitable processor, is provided that can assess the logic and or semantic relation of two given predictions.

Given two predictions, the engine response may be 1 of the 3 options below:
1. The predictions are equivalent
2. The predictions are contradicting
3. The predictions are not related logically and/or semantically For example, the following predictions may be defined as equivalent within a certain ontology:
(food price will rise and oil price will increase) or (apple share will climb up and real-estate will heighten) AND (real-estate will rise and apple share will increase) or (oil price will climb up and food price will heighten).

This example demonstrates both syntactic equivalence, such as A&B is equivalent to B&A where A is "food price will rise" and B is "oil price will increase" as well as semantic equivalence since the words "increase", "rise", "climb up" and "heighten" are marked in the ontology as synonyms.

For example, if the words "increase" and "decrease" and the words "goes up" and "goes down" are respectively deemed disjoint by the ontology, then the following declaratory predictions contradict each other:
1. oil price will increase next month
2. oil price will decrease next month as do the following conditional predictions:
1. if interest rate goes up, then apple share goes up
2. if interest rate goes up, then apple share goes down The method of FIG. 1 is not limited in its applicability to any specific type of Prediction-user interaction. The system may support any suitable technology, or several alternative technologies, allowing users to interact with predictions that exist in the system. In a proactive mode, users may searches for predictions using keywords, or browses through existing knowledge in the knowledge map. In a passive mode, a user may receive an email that contains predictions that were claimed aka generated by other users.

The method of FIG. 1 is not limited in its applicability to use cases in which Prediction creation is solely by users. It is appreciated that Predictions may be generated or created automatically in addition to or instead of being generated by analyst end users. For example:

Predictions (or any other knowledge contribution that are external to the system) can be imported into system from external electronic data sources such as but not limited to: World-wide-web, CRM/ERP, Documents.

According to certain embodiments, an Inference engine, typically implemented in software on a suitable processor, analyzes all predictions that exist in the database and it infers new predictions that are deduced from existing predictions. For example the following predictions are the premises:
1. "If event A happens then event B will happen"
2. "If event B happens then event C will happen"

From the premises above that system infers that "If event A happens then event C will happen". This inferred knowledge may then be either saved in database as a new prediction and/or suggested for users as new inferred knowledge for them to access and, if so desired, claim (e.g. define as a prediction).

According to certain embodiments, a data analytics engine, typically implemented in software on a suitable processor, analyzes all data predictions that exist in the database and it finds patterns of data. For example, if car sales data is imported to the system, the data analytics engine can find patterns such as "If cars price is greater than 100,000$ then the profit is greater than 300$".

According to certain embodiments, having accessed a prediction one way or another, a user can actively upvote in favour of the prediction or downvote against the prediction. In voting, the user assigns a level of confidence which he/she ascribes to the prediction e.g. quantifies how confident he/she is that the prediction is true (when upvoting) or false (when downvoting).

Typically, a vote data object may be defined which may include some or all of the following Vote properties: prediction id of the prediction that the user is voting on, user id of the analyst who is voting, vote type: [upvote, downvote], level of confidence e.g. [50 . . . 100] or [0 . . . 100] or verbal levels such as "not likely", "highly likely" etc.

Prediction scores may be generated, to enable evaluation of predictions based on voting and/or on data, using any suitable "knowledge scoring" process such as that described below by way of example. The description below assumes the following are defined as configurable parameters however this is not intended to be limiting: lambda_approval, lambda_disapproval, crowd_weight, data_weight, max_rating, lambda_rating where lambda_approval, lambda_disapproval, lambda_rating are positive scalars and crowd_weight+data_weight=1. Disjoint and synonym relations are assumed to be defined between at least some clauses in the ontology, although this is not intended to be limiting. It is also assumed that system users authenticate on a login screen hence each user has a known unique user profile which includes the user's email address, however again this is not intended to be limiting.

According to certain embodiments, the system supports some or all of the following user actions:
Creating a statement (aka prediction) including assigning to the statement the user's level of confidence therein (a scalar)
Removing a statement that the user earlier created.
Voting: a user may upvote or downvote for a statement to assign thereto his level of confidence therein; creating a prediction may be deemed equivalent to upvoting for the prediction.
The user can upload, update or delete tabular data containing numerical or categorical values. Every column of the tabular data should have a unique name that can match with the statement's subject.

Each prediction typically comprises "content" e.g. a textual statement such as "the interest rate in Japan will increase in April 2017", with an ontology, and is typically stored in conjunction with prediction metadata e.g. the ID or profile of the analyst who generated the prediction, the prediction's score, URL/s to data resource/s relevant to the prediction, and so forth. Prediction properties may include some or all of: content, prediction id, creator_user id, level of confidence e.g. from [50 . . . 100] or [0 . . . 100] or textual ordered levels e.g.: not likely, highly likely.

Predictions may be created by users and/or by an inference engine, typically implemented in software on a suitable processor, and/or by a data analytics engine, typically implemented in software on a suitable processor, and/or may be imported from an external source. In particular:

Typically, the system allows to users to add predictions (textual statements), Once a user adds a prediction to the system, he also assigns a level of confidence he has in the prediction. The system stores the prediction, the user name and his confidence level in the database.

Inference engine: May analyze some or all predictions in the system's prediction database and infer new predictions by deduction from existing predictions. Examples:
If the database includes:
Prediction 1: "If event A happens then event B will happen"

Prediction 2: "If event B happens then event C will happen"

The engine may infer that "If event A happens then event C will happen".

If the database includes:
   prediction 1: "If event D happens then event E happens"
   prediction 2: "Event D happens"
   the engine may infer that "Event E happens".

If the database includes:
   prediction 1: "If event D happens and Event G happens then event E happens"
   prediction 2: "Event D happens"
   prediction 3: "Event G happens"
   the engine may infer that "Event E happens".

If the database includes:
   prediction 1: "If event D happens or Event G happens then event E happens"
   prediction 2: "Event D happens"
   the engine may infer that "Event E happens".

This inferred knowledge may be saved in database as a new prediction or may be proposed to end users as new inferred knowledge from which end users may if they desire propose as a prediction.

data analytics engine: may analyze some or all data that exist in the database and find patterns of data which are then formulated as predictions and saved in the prediction database, or as candidate predictions for a user to approve or disapprove. For example, if car sales data is imported to the system, the data analytics engine may find patterns therein and generate the following predictions or candidate prediction "If car price is greater than 100,000$ the profit is greater than 300$".

External sources: Any predictions or other knowledge contribution existing in a computerized repository external to the system, e.g. World-wide-web, CRM/ERP. Documents can be imported into the system shown and described herein.

Any suitable Prediction-user interaction modes may be supported by the system including proactive Prediction-user interaction modes, where users search for predictions e.g. using keywords, or where the user browses existing knowledge using a knowledge map. Also, passive ("push") Prediction-user interaction modes may be provided e.g. where the user receives an email that contains predictions generated by other users. Once a user has encountered a prediction, whatever the interaction mode, the user can typically vote e.g. either upvote in favour of the prediction or downvote against the prediction. When voting, the user may be regarded as assigning to the prediction, his level of confidence therein. Each Vote may be stored by the system in a vote database including one or more vote properties e.g. prediction id, user id, vote type: [upvote, downvote], level of confidence e.g. [50 . . . 100] or [0 . . . 100] or textual levels e.g. not likely, highly likely.

A Prediction comparison engine, typically implemented in software on a suitable processor may be provided, which is operative to assess logic and or semantic relations between at least a pair of predictions.

Given two predictions, the engine may generate 1 of the following responses: The predictions are equivalent, The predictions are contradicting, or The predictions are not related logically and/or semantically.

For example, predictions may be deemed equivalent, based on a suitable set of equivalency criteria indicating, say, that predictions with the same and/or structure between clauses which are synonymous according to the ontology, are deemed equivalent; where "a and b" is deemed to have the same and/or structure as "b and a", etc. using conventional rules re equivalence of logical expressions.

For example: the following predictions I, II may be deemed equivalent.
   Prediction I: (food price will rise and oil price will increase) or (apple share will climb up and real-estate will heighten)
   Prediction II: (real-estate will rise and apple share will increase) or (oil price will climb up and food price will heighten).

Similarly, the following predictions may be deemed to contradict each other:
   iii. oil price will increase next month
   iv. oil price will decrease next month
as may the following:
   v. if interest rate goes up, then apple share goes up
   vi. if interest rate goes up, then apple share goes down Typically, contradictory predictions are identified inter alia by marking some terms in the prediction ontology as disjoint e.g. the words "increase" and "decrease", or the words "goes up" and "goes down".

Sub-crowd support scores: In a knowledge community of U users, it may be desired to compute a sub-crowd support score of statement relevant to a sub-crowd C which is a subset of U. The sub-crowd support score of a statement is typically computed as a function of some or all of: the statement, its equivalent statements and contradicting statements and the voting behaviour of the relevant sub-crowd:

$$\text{sub-crowd support score}=\text{function}(\text{statement}\_S, \text{sub\_crowd}\_C, \text{use\_user\_real\_rating})$$

The function may for example be as follows: The sub-crowd approval score for a statement S is computed by counting (a) all upvotes of sub-crowd C on statement S and on S's equivalent statements where creating a statement is typically deemed equivalent to upvoting for it; (b) all downvotes of sub-crowd C on S's contradicting statements; (c) optionally weighting each vote by its Level of confidence as it is counted; and (d) optionally weighting each vote by its user's rating. Typically, If use user_real_rating equals True, the true user ratings are used to weight each vote. Otherwise, if use user_real_rating equals False, all users may be assumed to have the same rating of, say, 1.

Similarly, the sub-crowd disapproval score for a statement S is computed using all upvotes of sub-crowd C on S's contradicting statements where creating a statement is deemed equivalent to upvoting for it, all downvotes of sub-crowd C on statement S and on S's equivalent statements, where each vote may again, similarly, be weighted by Levels of confidence of the votes and/or If use_user_real_rating equals True, by the true user ratings or, if use_user_real_rating equals False, all users may be assumed to have the same rating of e.g. 1.

Typically, the sub-crowd approval score and the sub-crowd disapproval score are subject to the law of diminishing marginal utility. So for example, for every N or at least some values of N, the Nth upvote for a statement S or for a statement S' equivalent to statement S increases the approval score more than the (N+1)th upvote does. Similarly for every N or at least some values of N, the Nth downvote for a contradicting statement increases the approval score more than the (N+1)th downvote does.

Then, the sub-crowd approval score, and sub-crowd disapproval score, may be used to compute a sub-crowd support score whose range is [0,100] e.g. using the following formula:

$$\text{sub-crowd support score} = 50*(1 - e^{-lambda\_approval*\text{sub-crowd approval score}} + e^{-lambda\_disapproval*\text{sub-crowd disapproval score}})$$

The single vote contribution to the sub-crowd approval/disapproval score may for example be the product of the user rating and vote/statement level of confidence.

For example when computing the sub-crowd approval score for statement 1 the relevant components to be combined may be
  a. statement 1's upvotes
  b. upvotes for statement 2 which is equivalent to statement 1
  c. downvotes for statement 3 (which contradicts statement 1

Assume a Sub-crowd of users {10, 11, 12} and assume use_user_real_rating equals True; The table of FIG. 3 shows score contributions; the sub-crowd approval score is the sum of all score contributions hence the sub-crowd approval score=0.99+1.61+1.02+2.07=5.69.

If in the above example use_user_real_rating equals False rather than True, the table of FIG. 3*b* shows score contributions; the sub-crowd approval score again is the sum of all score contributions hence this time, the sub-crowd approval score=0.9+0.7+0.6+0.9=3.1. Computing now the sub-crowd disapproval score for statement 1, the relevant components to be combined may be statement 1's downvotes; downvotes for statement 2 which is equivalent to statement 1 and upvotes for statement 3 which contradicts statement 1. Assume a Sub-crowd of users {10, 11, 12} and assume use_user_real_rating equals True; the table of FIG. 3*c* shows score contributions: the sub-crowd disapproval score is the sum of all score contributions hence thus sub-crowd disapproval score=0.69+0.85=1.54.

Optionally, as described herein, the system architecture is used to support User rating for each end user. New users, i.e. users that have neither predictions nor votes, may be assigned an initial rating of, say, 1. For user X, User_mean_score UMS is computed as follows: Fetch all statements S created by user X (alternative—fetching all statements either created on or voted on by user X). For every statement in set S compute that statement's sub-crowd support score using the sub-crowd support score computation described herein. The relevant sub-crowd relevant for the above computation may be deemed to be all users except user X (i.e. user X may be excluded from the sub-crowd over which the UMS is computed). The sub-crowd support score may be computed with parameter use_user_real_rating equals False. Then, compute a central tendency e.g. Mean, median or mode, for the above sub-crowd support scores. Given the User_mean_score UMS, the user rating may be computed as follows: if UMS equals to or smaller than 50 then user rating is 1.
else, if UMS is greater than 50 then user rating is computed as:

$$\text{user\_rating} = 1 + \text{max\_rating}*(1 - e^{-lambda\_rating*UMS})$$

A Crowd support score may be computed for a statement using the sub-crowd support score computation described above where typically, the sub_crowd used is the whole universe of users, i.e. no user is excluded and use_user_real_rating equals True.

For a declarative statement, the following may be taken into account when computing the data support score: Number of rows in the data source, Number of rows that meet the statement condition. The data support score is computed as a ratio e.g. the proportion of rows in the data that meet the statement condition, from among all rows in the data source. The range of the data support score is then [0,100]. For a conditional statement, the following may be taken into account when computing the data support score: Number of rows that meet the statement condition, Number of rows that meet both the statement condition and the statement conclusion. The data support score may be computed as a ratio e.g. the proportion of rows in the data that meet both the prediction condition and prediction conclusion, from among all rows that meet the prediction condition.

Example: Assume that the data source is the tabular data of FIG. 4 and that given is a declarative statement: "the interest rate is greater than 2%". In the table of FIG. 4, 4 rows meet the statement condition: {2, 3, 4, 5}. 5 rows are in the data source: {1, 2, 3, 4, 5}. Therefore the data support score for this statement is 100*4/5=80.

Also given is a conditional statement: "if the interest rate is greater than 2% and the oil index equals 3.4 then Apple share worth less than 10$". In the table of FIG. 4, there are 2 rows that meet both condition and conclusion: {3, 5} and there are 3 rows that meet the condition: {3, 4, 5}. Therefore the data support score for the statement is 100*2/3=66.6.

It is appreciated that the architecture shown and described herein the data support score to be recomputed and updated accordingly, whenever relevant data is updated, changed, deleted or added.

An Epistemological score may be generated for each prediction, to enable computerized ordering of predictions in the database. The Epistemological score of a prediction may be generated by combining user votes on the prediction with a measure of the extent of available data's consistency with the prediction.

An Epistemological score of prediction x may increase to the extent that:
  Users upvote for x
  Users upvote for a prediction equivalent to x
  Users downvote for a prediction which contradicts x
  Data in the system is consistent with x.

Conversely, a Prediction score (aka a prediction's Epistemological score) may decrease to the extent that:
  Users downvote for x
  Users downvote for a prediction equivalent to x
  Users upvote for a prediction which contradicts x
  Data in the system is inconsistent with x.

An example formula for computing an epistemological score whose range is [0,100] Is: epistemological score
  =crowd_weight*crowd support score+data_weight*data support score
However, if no data is available either to support or to refute the prediction, then:
  epistemological score=crowd score.

Figure 5:

FIG. 5 is a simplified flow of a method for automatically maintaining evaluations for each of a multiplicity of predictions in accordance with certain embodiments, including combining crowd score with data support score for at least some predictions. The method of FIG. 5 may include some or all of the following operations a-j, suitably ordered e.g. as follows:
  a. (off-line) build an ontology of synonyms and disjoint terms
  b. collect forecasts (declarations and if-statements) from a crowd of analysts. Forecasts include only terms in the ontology, e.g.:

1. each if statement expressed using reserved words "if" and "then", as follows: "if (condition clause) then (conclusion clause)
2. clauses or declarations which are compound (are logical combinations of other clauses) must be expressed using reserved words "or", "and" e.g. "if clauseA or clauseB then clauseC"
c. use the ontology to identify:
   pairs of forecasts which are equivalent, pairs of forecasts which are contradictory, pairs of declarations which are equivalent, and pairs of declarations which are contradictory.
d. accumulate upvotes and downvotes (peer feedback/crowd scores) for each/some forecasts.
e. generate crowd score for each prediction: positively-combine upvotes and downvotes for equivalent pairs of predictions. negatively-combine upvotes and downvotes for disjoint pairs of predictions. This operation may be performed periodically e.g. daily or hourly and/or upon request. For example, if an end user clicks on an edge or node in a representation of a prediction graph then responsively the relevant conditional or declarative prediction may be displayed to the end user, including computing the prediction's up to date score and presenting same to the end user. According to some embodiments, individual scores are not updated each and every time an analyst votes for or against a particular prediction, although this is also a possible implementation. According to some embodiments, score updating includes combining all votes ever cast for or against a particular prediction. According to other embodiments, score updating includes combining all votes cast for or against a particular prediction since the previous update, with the previous score.
f. The user uploads tabular data containing numerical or categorical values. Every column of the tabular data typically has a unique name that can match with the statement's subject.
g. Whenever the data is updated, changed, deleted or added, data scores are updated accordingly.

Any suitable logic may be employed to determine which tables are related to specific predictions, hence these predictions should be updated each time these tables change. For example, given a prediction: "If interest rate rises, housing index will rise." All tables having both an "interest rate" column and a "housing index" column may be deemed related to that prediction, such that if any of those tables change, the score of the prediction is deemed to require an update. As described above, updates may in practice occur immediately or at any other predetermined time e.g. periodically and/or upon request. h. Using the tabular data, compute data score e.g. as described herein.
i. Combine accumulated crowd scores and data scores into an epistemological score, for each prediction, e.g. as described herein. Here too, updates may in practice occur immediately or at any other predetermined time e.g. periodically and/or upon request.
j. update the crowd scores and/or data scores and/or epistemological score, for each relevant prediction's page; the page which may be associated via a URI to a node or edge in a prediction graph generated by the method of FIG. 1.

Conventional graph database software such as Neo4j, Titan, Giraph and OrientDB may be used to store data topologically and has graph querying language for formulating queries about nodes and edges in a topological graph, once stored in memory. For example, a file may be provided to this software as input, which may for example include a table such as an excel table having a column of predictions (aka statements or claims), and the software may read the data from the file and map the data accordingly into a tabular data structure to be broken down into a topological graph structure. Edges and/or nodes in the graph structure may then be defined to have url's to network resources such as pdf's, alphanumeric data tables and node/edge "pages" presenting characteristics thereof or functionalities associated thereto. According to certain embodiments, each prediction is represented in memory as a single root node connected via edges to nodes representing logical connectors if any in the prediction such as AND, OR, and also connected by edges e.g. via the logical connect nodes, to the clauses of the prediction (e.g. a, b, c, d in the prediction "if a and b or c and d then x. In this case, one or more urls for that prediction may be stored in association with the root node only.

For example, the software may support, for each node and also for each edge in the graph database, a payload of properties carried by that node. Therefore, for example, a node that functions as a root of a graph, once stored in memory, may be manually defined or programmed to include URI/s of network resources associated with that node.

Once the graph is generated, prediction scores and analyst ratings may be maintained efficiently e.g. as described herein in detail. For example, these scores and ratings may be updated periodically e.g. once a day or once an hour or once a week or at any other suitable interval, e.g. as described herein in detail. Functionalities such as determining whether each row in each table associated with one or more node/s supports or contradicts the prediction/s represented by that node, may be performed either manually or automatically.

Also, once the graph is generated, a visualization of some or all of the graph, such as that shown in FIG. 2 by way of example, may be prepared efficiently. For example:

A user requests to see a knowledge graph for, say, "the gross domestic product (GDP) in the United States". A visualization of a suitable portion of the stored topological graph may be created, responsively, by the server, including some or all of the following operations, suitably ordered e.g. as shown:
1. graph database receives query, e.g. from end user, for the set N1 of all nodes containing US GDP.
2. for every node n in set N1, traversing the graph database starting from node n and finding all connected statements/predictions by implication connectors (aka directional edges). Collect all the results in set N2.
3. for every prediction c in set N2, collapse the prediction into either a single node (for a declarative prediction) or into two nodes connected by an edge (for a conditional prediction). Collect the results into a graph structure G.
4. send graph structure G to the client side, where a visualization is created on the user screen e.g. using a conventional standard visualization library e.g. a JavaScript library such as D3.js.

In FIG. 2, each node is shown with the clause associated therewith (except for one of the nodes where space considerations make this impossible) and nodes (predictions) that contradict are interconnected by dashed lines. It is appreciated that if an end user clicks on an edge linking, say, the node representing the "organizationname.org is not establishing caliph independent empire" clause to the node representing the "organizationname.org is not achieving vision" clause then the system may present to the user a virtual box including a textual representation of the prediction e.g. "if organizationname.org is not establishing caliph independent empire then organizationname.org is not achieving vision" as well as data regarding that prediction such as the score thereof (e.g. 50%) and/or the ID e.g. name of the creator thereof, from among the many end users (e.g. analyst Joe Smith). Also, typically, if the end user clicks on the box (e.g. on an icon in the box representing a URL) then the URL associated with this prediction is activated, thereby to open for the user, typically in a separate browser tab, resource/s pertaining to this prediction e.g. a PDF natural language document supporting this prediction.

Any implementation herein described as including any one of a uniform resource identifier, Uniform Resource Locator (URL), hyperlink, link may alternatively be implemented using any other of these.

It is appreciated that any suitable topological representation may be employed to store the predictions as a graph database and/or to present predictions as a visual representation generated from the graph database. In particular, the specific topological representation described herein for the visual representation (e.g. if clause A then clause b represented as a directional edge from node A to node B; URL associated with edge or for a declarative prediction, with the node associated with the prediction's clause) may be used for the graph database and/or the specific topological representation described herein for the graph database (e.g. root node per prediction, associated with URL/s, connected via edge to logical operator nodes, connected via edges to clauses combined by the logical operators) may be used for the visual representation. If the first and second topological representation employed to store the predictions as a graph database and as a visual representation respectively differ, the server converts the first representation as stored in memory to the second, when generating the visual representation.

A particular advantage of certain embodiments is that interrelations between work products of different end users (analysts) ostensibly in different fields are easily discovered, relative, say, to conventional systems serving analysts in which summaries/analyses/reports are simply uploaded to a common repository e.g. Sharepoint, Dropbox or Googledrive.

A particular advantage of certain embodiments is that the computerized environment thus provided allows hundreds or more of analysts to effectively cope with tens of thousands or more predictions, rather than sharing all information with everyone or rather than inspecting only some information which is really a haphazardly selected subset of the totality of available information. for example, the graph may show that John's prediction (if A then B) where A and B are both events occurring in Japan, is related to C, a seemingly unrelated event occurring in far-off Nigeria, because a high-scoring path (sequence of edges) within the graph connects C to A, perhaps via 2 or 3 or 10 or more other nodes and a similar number of directional edges. Typically a path is a sequence of directional edges interconnecting nodes 1, 2, 3, 4, . . . where the first edge goes from node 1 to 2, the second goes from 2 to 3, the third from 3 to 4, and so on. In contrast, the following is typically not a path: a sequence of directional edges interconnecting nodes 1, 2, 3, 4, . . . where the first edge goes from node 1 to 2, the second goes from 3 to 2, the third from 3 to 4, and so on.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or clients for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

What is claimed is:

1. A method providing a computerized environment for at least one human expert analyst community including a multiplicity of human expert analyst end users, the method including:
   for at least one organization including a human expert analyst community:
      defining a prediction ontology stored in computer memory, including at least one predetermined grammatical structure for predictions generated by human expert analysts in the community, and wherein the grammatical structure for conditional predictions includes an antecedent clause and a consequence clause;
      providing digitally represented analyst predictions, including at least one individual analyst prediction which is expressed in the prediction ontology, is conditional, and is associated with at least one individual known network location from among a universe of network locations within the organization's computerized data network at which individual known network location, at least one resource pertaining to said individual analyst prediction is stored;
      providing a voting functionality enabling analysts to vote on predictions, wherein the voting functionality includes at least one prediction attracting more than N upvotes, including an Nth upvote and an (N+1)th upvote, the Nth upvote increases at least one prediction's crowd score prediction more than the (N+1)th upvote does; and
      using a processor for generating and storing in computer memory a uniform resource identifier-embedded prediction graph comprising:
         nodes, including at least first and second nodes which represent the individual analyst prediction's antecedent and consequence clauses respectively, and
         edges, including at least one directional edge extending between the first and second nodes,
         and wherein a uniform resource identifier identifying said individual known location is embedded in at least one of the nodes and edges.

2. A method according to claim 1 wherein the uniform resource identifier comprises a locator specifying the resource's location on the network and including functionality for retrieving the resource to provide access of a network user thereto.

3. A method according to claim 2 wherein said locator comprises a URL.

4. A method according to claim 1 wherein said uniform resource identifier-embedded prediction graph comprises a hyperlinked graph in which at least one of the nodes and edges is hyperlinked to said individual known location.

5. A method according to claim 4 wherein at least one of the nodes and edges is hyperlinked directly to said individual known location.

6. A method according to claim 4 wherein at least one of the nodes and edges is hyperlinked indirectly to said individual known location.

7. A method according to claim 6 wherein at least one of the nodes and edges is hyperlinked to a page which stores data regarding said at least one of the nodes and edges, including said individual known location, thereby to indirectly link said at least one of the nodes and edges to said individual known location.

8. A method according to claim 1 wherein said resource comprises at least one natural language document.

9. A method according to claim 1 wherein said resource comprises at least one alphanumerical data resource.

10. A method according to claim 1 wherein the uniform resource identifier is embedded in at least one of the nodes.

11. A method according to claim 1 wherein the uniform resource identifier is embedded in at least one of the edges.

12. A method according to claim 1 including identifying at least first and second clauses as equivalent/identical within the ontology and representing at least said first and second clauses by a single node in said graph.

13. A method according to claim 12 wherein all clauses which are identical within the ontology are represented by a single node in said graph.

14. A method according to claim 1 and wherein an analyst can access said voting functionality and vote for/against an individual node from among said nodes, via at least one uniform resource identifier embedded at said individual node, and wherein analyst votes for each individual node are combined over analysts to yield a crowd score for the individual node.

15. A method according to claim 14 and wherein a data score is also generated for the individual node and is combined with said crowd score.

16. A method according to claim 1 and wherein an analyst can view voting results generated by said voting functionality for an individual node from among said nodes, via at least one uniform resource identifier embedded at said individual node.

17. A method according to claim 1 and wherein a data score is generated for an individual node from among said nodes, including accessing and parsing at least one alphanumeric data table linked to the individual node via at least one uniform resource identifier embedded at said individual node.

18. A method according to claim 17 and wherein updating the alphanumeric data table triggers at least one update of data scores of all nodes associated with said alphanumeric data table and not of nodes not associated with said alphanumeric data table.

19. A method according to claim 17 and wherein an analyst can view data scores generated for an individual node from among said nodes, via at least one uniform resource identifier-embedded at said individual node.

20. A method according to claim 1 and also comprising presenting a representation of at least a portion of said uniform resource identifier-embedded prediction graph to at least one analyst end user from among the multiplicity of analyst end users, thereby allowing said multiplicity of analyst end users to interact effectively with said predictions including effectively accessing resources within said computerized data network which pertains to said predictions.

21. A method according to claim 1 wherein said resource comprises an audio-visual resource.

22. A method according to claim 1 wherein said voting functionality further includes at least one prediction having a contradicting prediction attracting more than N downvotes, including an Nth downvote and an (N+1)th downvote, the Nth downvote increases the at least one prediction's crowd score prediction more than the (N+1)th downvote does.

23. A method according to claim 1 wherein a legacy graph database software tool, which supports storage of node properties, is used to generate said graph and wherein a text string representing at least one URI identifying a network location storing a resource pertaining to a particular node is stored as a property of said particular node.

24. A method according to claim 1 wherein said digitally represented analyst predictions also include at least one declarative analyst prediction.

25. A computer program product, comprising a non-transitory tangible computer readable medium having computer readable program code embodied therein, said computer readable program code adapted to be executed to implement a method providing a computerized environment for at least one human expert analyst community including a multiplicity of human expert analyst end users, the method including:

for at least one organization including a human expert analyst community:

defining a prediction ontology stored in computer memory, including at least one predetermined grammatical structure for predictions generated by human expert analysts in the community, and wherein the grammatical structure for conditional predictions includes an antecedent clause and a consequence clause;

providing digitally represented analyst predictions, including at least one individual analyst prediction which is expressed in the prediction ontology, is conditional, and is associated with at least one individual known network location from among a universe of network locations within the organization's computerized data network at which individual known network location, at least one resource pertaining to said individual analyst prediction is stored; and providing a voting functionality enabling analysts to vote on predictions, wherein the voting functionality includes at least one prediction attracting more than N upvotes, including an Nth upvote and an (N+1)th upvote, the Nth upvote increases at least one prediction's crowd score prediction more than the (N+1)th upvote does;

using a processor for generating and storing in computer memory a uniform resource identifier-embedded prediction graph comprising:

nodes, including at least first and second nodes which represent the individual analyst prediction's antecedent and consequence clauses respectively, and edges, including at least one directional edge extending between the first and second nodes, and wherein a uniform resource identifier identifying said individual known location is embedded in at least one of the nodes and edges.

26. A system providing a computerized environment for at least one human expert analyst community including a multiplicity of human expert analyst end users, the system including:

for at least one organization including a human expert analyst community:

computer memory storing a prediction ontology, including at least one predetermined grammatical structure for predictions generated by human expert analysts in the community, and wherein the grammatical structure for conditional predictions includes an antecedent clause and a consequence clause;

and digitally represented analyst predictions, including at least one individual analyst prediction which is expressed in the prediction ontology, is conditional, and is associated with at least one individual known network location from among a universe of network locations within the organization's computerized data network at which individual known network location, at least one resource pertaining to said individual analyst prediction is stored; and a processor operative for generating and storing in computer memory a uniform resource identifier-embedded prediction graph comprising:

nodes, including at least first and second nodes which represent the individual analyst prediction's antecedent and consequence clauses respectively, and edges, including at least one directional edge extending between the first and second nodes, and wherein a uniform resource identifier identifying said individual known location is embedded in at least one of the nodes and edges; and wherein the processor is further operative to enable analysts to vote on predictions by providing a voting functionality, wherein the voting functionality includes at least one prediction attracting more than N upvotes, including an Nth upvote and an (N+1)th upvote, the Nth upvote increases at least one prediction's crowd score prediction more than the (N+1)th upvote does.

* * * * *